[11] 3,993,955
[45] Nov. 23, 1976

[54] METHOD OF AND APPARATUS FOR ESTABLISHING EMERGENCY COMMUNICATIONS IN A TWO-WAY CABLE TELEVISION SYSTEM

[75] Inventors: Brian E. Belcher, Dallas; John G. Cambell, Irving, both of Tex.

[73] Assignee: TOCOM, Inc., Dallas, Tex.

[22] Filed: Apr. 25, 1975

[21] Appl. No.: 571,536

[52] U.S. Cl. .............................. 325/308; 325/392; 325/466; 178/DIG. 13; 178/DIG. 15; 340/416
[51] Int. Cl.² .......................................... H04B 1/06
[58] Field of Search .......... 340/310 R, 310 CP, 224, 340/416; 325/308, 391, 392, 394, 466; 178/DIG. 13, DIG. 15

[56] References Cited
UNITED STATES PATENTS

| | | | |
|---|---|---|---|
| 3,796,829 | 3/1974 | Gray | 325/308 |
| 3,886,538 | 5/1975 | Takeuchi | 340/310 R |

Primary Examiner—Thomas B. Habecker
Attorney, Agent, or Firm—Giles C. Clegg, Jr.

[57] ABSTRACT

In a two-way cable television communications system wherein a central or master station is coupled to a plurality of remote stations through a coaxial cable network, each remote unit is provided with means for decoding an emergency alert transmission signal from the master station to generate an internal signal to sound an annunciator, alerting a subscriber or viewer at the remote station that an emergency communication is forthcoming, switching on a television receiver at the remote station, if the television receiver is not on, and tuning the television receiver through a converter to a predetermined television channel to condition the television receiver to receive emergency communications from the master station.

8 Claims, 4 Drawing Figures

METHOD OF AND APPARATUS FOR ESTABLISHING EMERGENCY COMMUNICATIONS IN A TWO-WAY CABLE TELEVISION SYSTEM

BACKGROUND OF THE INVENTION

1. Field of the Invention

The present invention relates to two-way cable television communications systems and, more particularly, to a method of and apparatus for establishing emergency communications between a master station and one or more remote stations in such a system.

2. Technical Consideration in Prior Art

In most two-way cable television communications systems, for example, the system set forth in Osborn et al Pat. No. 3,794,922 and Osborn U.S. Pat. No. 3,803,491, video information, in the form of imported or locally originated television programs may be transmitted from a central station to a plurality of remote stations when a viewer at the remote location switches on a television receiver at the remote station, which is coupled to the master station through a coaxial cable network. During emergencies, for example, civil defense emergencies, it would be desirable to provide such systems with the capability of transmitting both video and audio information to the remote stations, regardless of whether or not the television receivers at the remote locations are on or off in order to insure that emergency civil defense instructions or other emergency information such as local flood or tornado warnings can be communicated to subscribers or viewers at the remote stations. It is further desirable to alert the viewer that an emergency transmission is forthcoming and to provide a preassigned emergency alert channel which can be automatically tuned from the master station.

SUMMARY OF THE INVENTION

One object of the present invention is to provide a new and improved method of an apparatus for establishing emergency communications between a master station and a remote station in a two-way cable television system.

A further object of the present invention is to provide a new and improved method of and apparatus for establishing emergency communications between a master station and a remote station in a two-way cable television system wherein video and audio information may be transmitted from the master station to the remote television receiver, whether or not the television receiver is on or off.

A further object of the present invention is to provide a new and improved method of and apparatus for establishing emergency communications between a master station and a remote station in a two-way cable television system wherein, upon a signal generated by the master station, the remote station operates to sound a local alarm or annunciator, turn on the remote television receiver, and tune the receiver to a predetermined emergency channel without any action being taken by the subscriber at the remote location.

A method of establishing emergency communications between a master station and a remote station in a two-way cable television system, in accordance with the principles of the present invention, may include the steps of activating an annunciator means at the remote station upon application of a first signal, connecting power to a television receiver at the remote station upon application of a second signal, tuning the remote station to predetermined channel upon application of a third signal, establishing the first, second and third signals in response to a fourth signal, conditioning the generation of the fourth signal in response to a coded function signal from the master station, and generating the fourth signal in response to a coded command signal from the master station.

An apparatus for establishing emergency communications between a master station and a remote station in a two-way cable television system, in accordance with the principles of the present invention, may include annunciator means at the remote station, means for activating the annunciator means upon application of a first signal, means for connecting power to a television receiver at the remote station upon application of a second signal, means for tuning the remote station to a predetermined channel upon application of a third signal, means for establishing the first, second and third signals in response to a fourth signal, means for generating the fourth signal, means responsive to a coded function signal from the master station for conditioning the fourth signal generating means for operation, and means responsive to a coded command signal from the master station for operating the fourth signal generating means.

BRIEF DESCRIPTION OF THE DRAWINGS

A complete understanding of the present invention will be obtained from the following detailed description of a preferred embodiment thereof, when read in conjunction with the accompanying drawings wherein.

DETAILED DESCRIPTION

Figure 1:
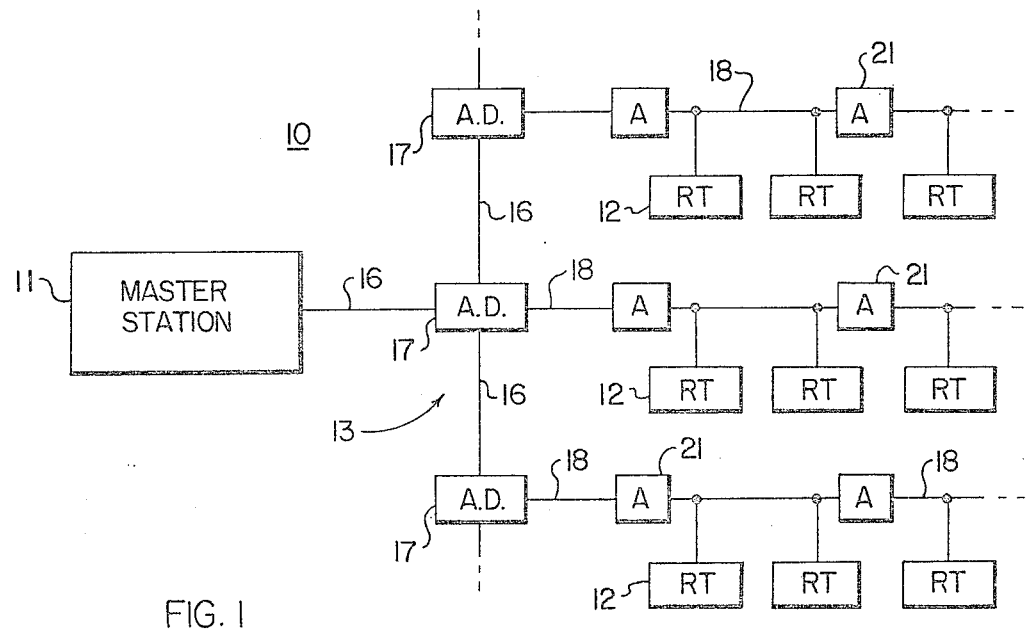
FIG. 1 is a block schematic diagram of a two-way cable television communications system.

Referring to FIG. 1, there is shown a broad band, coaxial, two-way cable television communications system 10 which includes a computer-controlled master or central station 11 connected to a plurality of remote units or transceivers 12—12 through a coaxial cable network or signal distribution system indicated generally at 13. The cable distribution system 13 includes a coaxial trunk cable 16 having various by-directional trunk amplifier and distribution units 17—17 connected at spaced points therealong. Coaxial type feeder cables 18—18 extend outwardly from respective ones of the amplifier and distribution units 17—17 to connect the remote transceivers 12—12 into the system 10. Various bidirectional amplifiers 21—21 are located at spaced points along the feeder cables 18—18 to amplify signals transmitted downstream from the master station 11 to the remote transceivers 12—12 and to amplify upstream transmission signals from the remote transceivers 12—12 to the master station 11.

The master station 11, which is the main control element of the system 10, supervises, monitors and interprets all communications therein. Each remote transceiver 12 decodes the informations intended for itself which is sent downstream from the master station 11 and executes commands transmitted to it from the master station 11 through cable network 13.

The system 10 may be of the general type disclosed in Osborn et al U.S. Pat. No. 3,794,922 and Osborn U.S. Pat. No. 3,803,491. The remote transceivers 12—12 are intended to be installed in homes, apartments and business locations, for receiving video and audio information transmitted by the master station 11.

Figure 2:
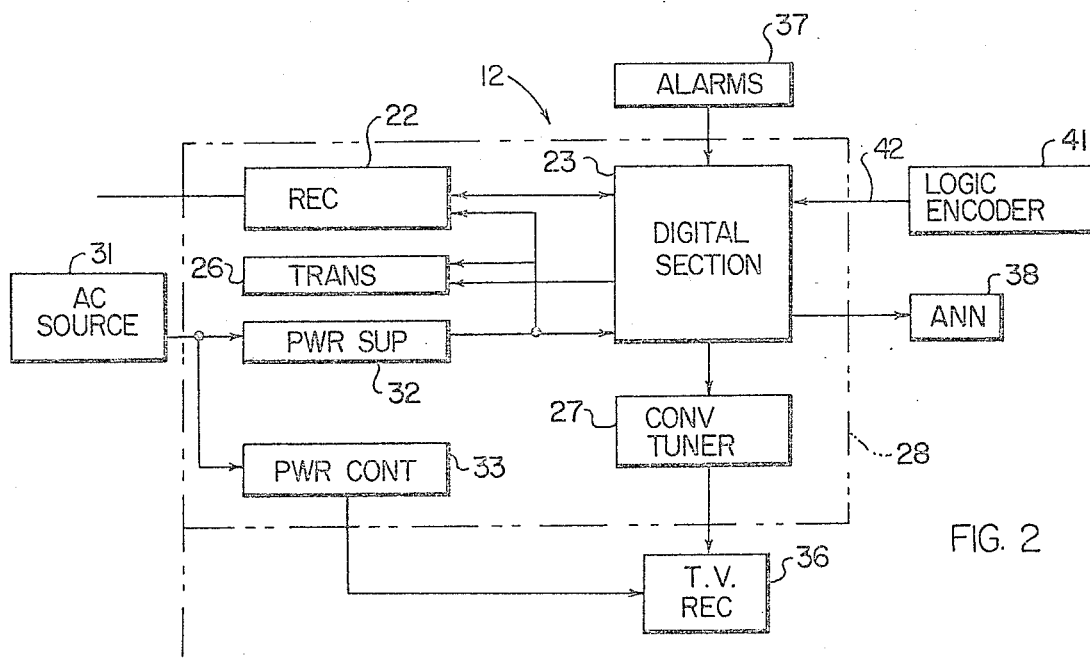
FIG. 2 is a block schematic diagram of a remote station or transceiver, being part of the two-way cable television communications system of FIG. 1.

Referring to FIG. 2, there is shown a block diagram of an individual remote transceiver 12. Each remote transceiver 12 includes several subassemblies including an RF receiver 22, a digital section 23, an RF transmitter 26, and a video convertertuner 27, all housed in an enclosure 28. An external AC source 31, for example, a 120v 60hz source provided by a public utility, supplies proper operating voltage levels to the receiver 22, the digital section 23 and the transmitter 26 through a power supply circuit 32, also housed in the enclosure 28 along with a power control circuit 33 which supplies operating potential to a commercial television receiver 36 which has its RF input connected to the output of the converter-tuner 27.

External alarm sensors 37, wich represent, for example, fire and burglar alarms, are connected to the digital section 23 for transmitting fire and burglar alarm information back to the master station 11 through the cable network 13 and for sounding an annunciator 38 at the remote location to warn the system subscriber at that location that an alarm condition exists.

The remote transceiver assembly enclosure 28 is preferably a model HT-2 home terminal manufactured by Tocom, Inc. of Dallas, Texas modified in accordance with the present invention as explained below. A hand-held logic encoder or remote control unit 41, which is coupled to the digital section 23 through a multi-conductor cable 42, may be utilized by a subscriber to control various functions at the remote transceiver 12, for example, to turn on and select a particular program channel for the television receiver 36 and to encode and transmit viewer opinion and program rating information to the master station 11.

The logic encoder 41 is shown and described in the copending application of B. E. Belcher, et al Ser. No. 571,576, filed on even date herewith.

The RF receiver 22 interfaces the remote transceiver 12 to the cable network 13 and detects digital data transmitted downstream from the master station 11. The detected data is translated to standard TTL logic levels compatible for input to the digital section 23, which receives the detected digital data from the RF receiver 22, stores the information in various shift registers therein, and subsequently analyzes the data for possible action. Among other things, the digital section 23 has the capability of executing a number of predetermined commands upon coded instructions from the master station 11 through the use of function and command codes. For example, one specific function enables or disables the transmitter 26 from operation.

The RF transmitter 26 accepts the digital information from the digital section 23 and translates the received data into modulated form compatible for detection by the master station 11 during upstream transmission.

The converter-tuner 27 is a television channel converter which translates thirty-two contiguous channels of commercial video bandwidth information into a single television channel output corresponding to a commercial television channel, for example, channel 3 or channel 12, on the television receiver 36.

The logic encoder unit 41 provides a digital output which may be read directly by a data readout circuit in the digital section 23 and applied to the RF transmitter 26 in response to an interrogation signal transmitted downstream from the master station 11 to the remote transceiver 12, to indicate to the master station which channel has been selected and is thus being viewed on the television receiver 36. The digital channel information output of the digital section 23 is converted to an analog voltage by a digital-to-analog converter therein and is applied to a resistor network in the video converter 27 which provides a predetermined voltage to a varactor tuner which selects one channel out of the television program information transmitted from the master station 11 to the remote transceiver 12.

Figure 3:
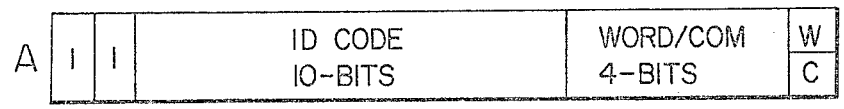
FIGS. 3A and 3B are schematic diagrams of two signals formats, being part of a transmission sequence in the system of FIG. 1.
Figure 3:
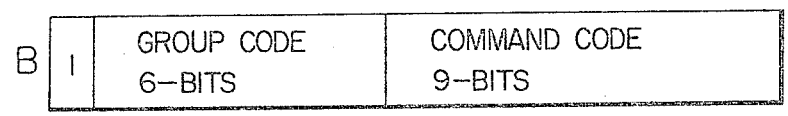

Referring to FIG. 3, there is shown two of the basic transmission data formats employed in the system 10. Each transmission sequence is initiated by an interrogation code signal from the master station 11 as shown in FIG. 3A. The remote transceivers 12—12 which are identified by the interrogation signal, subsequently accept an additional 16-bit command code as shown in FIG. 3B to be executed at one or more of the remote transceivers 12—12.

Referring to FIG. 3A, the interrogation format includes an initial pair of logic 1 pulses which are transmitted to allert the remote transceiver 12 that a sequence is forthcoming and to synchronize the system. Thereafter follows a 10-bit field containing a unit identification code which permits 1023 identification codes to be utilized to identify units which have been precoded to match the interrogation code. Only those units precoded to match the interrogation code will continue to accept subsequent incoming data. The next incoming field shown in FIG. 3A is a 4-bit word-command code which indicates which one of a plurality of predetermined words will be transmitted to the master station 11 from the identified remote unit, or which of a plurality of commands to be executed at the remote unit will be forthcoming from the master station 11. The final one-bit field shown in FIG. 3A indicates whether a word code or command code was intended in the previous field. The interrogation sequence shown in FIG. 3A contains 17 bits of information which are transmitted at a rate of 40 microseconds per bit resulting in a total required transmission time of 680 microseconds.

FIG. 3B shows a command code, which is the designation given to the transmission sequence when it is desired to perform an electrical or mechanical function at the remote function. After an initial logic 1 pulse, there follows a 6-bit group code which identifies exactly wich remote transceiver 12 is expected to perform the particular command. Thereafter follows a 9-bit command code field which identifies exactly which command shall be performed at the remote transceiver.

The ability to transmit command codes and the transmission sequences which permit the performance of particular commands at the remote transceiver, are utilized in the context of the present invention to: (a) activate the annunciator 38 to alert a subscriber at the remote location; (b) turn on the television receiver 36 to condition it for subsequent video and audio reception; and (c) tune the converter tuner 27 to a predetermined program channel which has been designated an emergency alert channel to provide the subscriber with emergency information. This emergency alert transmission function is capable of operating whether or not the television receiver 36 is being viewed by a subscriber. If the television receiver 36 is being viewed and the converter tuner 27 is tuned to one of the commercial channels, an emergency alert command signal transmission sequence will automatically lock the converter-tuner 27 onto the emergency alert channel, interrupting the program being viewed to condition the receiver 36 for reception of an emergency broadcast transmission from the master station 11.

Figure 4:
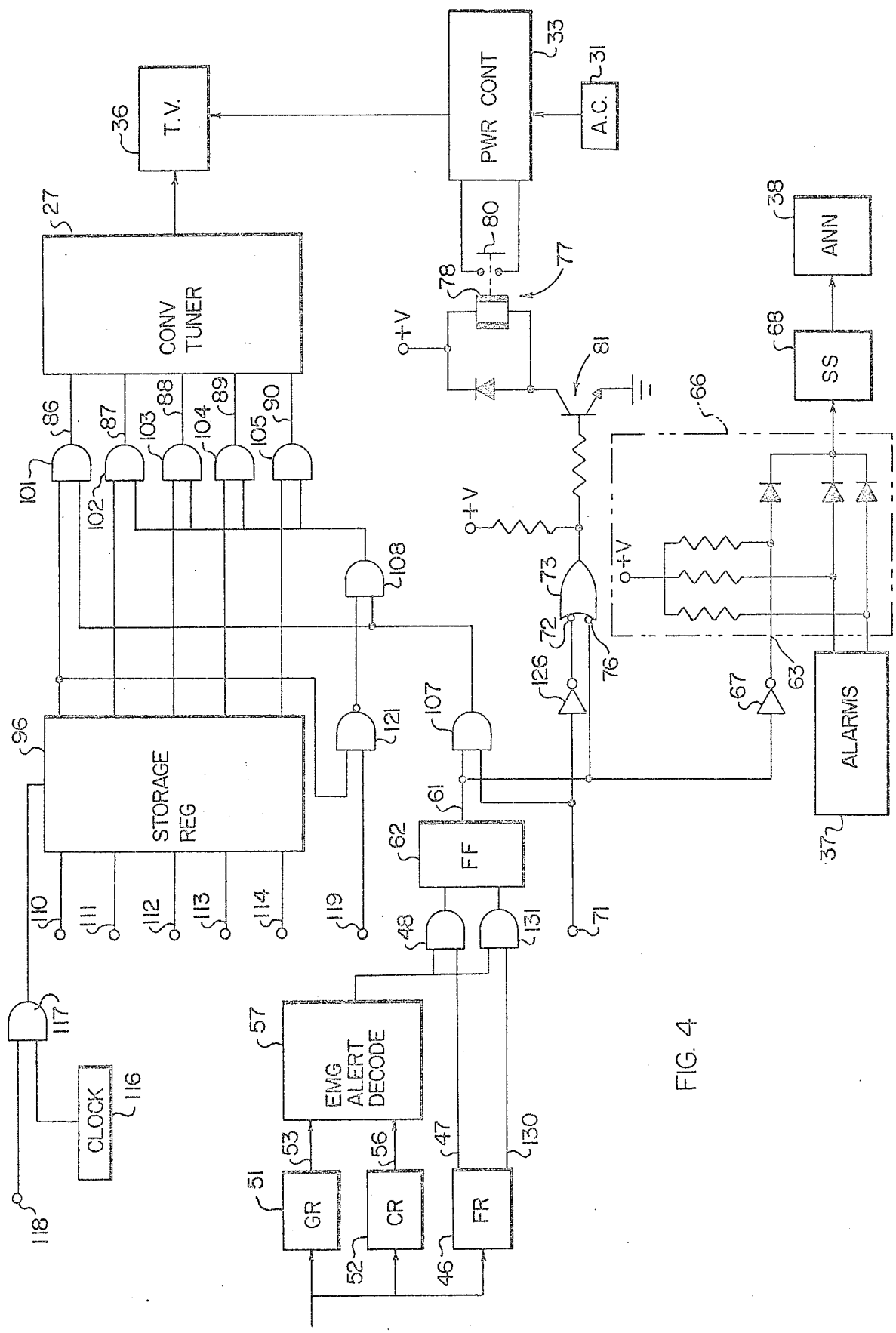
FIG. 4 is a detailed schematic diagram, partially in block form, of a portion of the remote transceiver of FIG. 2, for enabling emergency communications to be established between the master station and the remote transceiver.

FIG. 4 shows in greater detail those parts of the remote transceiver 12 of FIG. 2 necessary to an understanding of the emergency alert capability of the system 10. Referring to FIGS. 3 and 4, when the interrogation code signal having the format shown in FIG. 3A is received, those remote transceivers 12 having been precoded to respond to the particular 10 bit identification code, would be conditioned to receive a 4-bit emergency alert command code, which is stored in a function code register 46, establishing a logic high voltage level on an output 47 thereof to enable an AND gate 48. All remote transceivers identified by the 10-bit identification code would continue to receive the subsequent command code having the format shown in FIG. 3b. Only those receivers, however, which are predesignated to respond to the additional 6-bit group code of FIG. 3B, would be conditioned to receive the 9-bit emergency alert command code. The 6-bit group code and the 9-bit command are stored, respectively, in a group code register 51 and a command code register 52, having outputs 53 and 56, respectively, coupled to an emergency alert decoder 57.

If the remote transceiver matches the group code stored in the register 51, the application of an emergency alert command code on the output 56 of the register 32 will establish a logic high voltage level at a second input to the AND gate 48 coupled to the output of the decoder 57 to change the state of an output 61 of a flip-flop 62 from a normally high to a low logic level.

When the output 61 of the flip-flop 62 goes low, a logic high voltage level is established at an input 63 of an annunciator activating circuit 66 through an inverter 67 to activate a one shot 68 which activates the annunciator 38 for a predetermined period of time, for example, 30 seconds to alert a subscriber that an emergency transmission from the master station 11 is forthcoming.

Assuming, at this time, that the television receiver 36 is in an off condition, an on/off input 71 of the digital section 23 is low, establishing a logic high voltage level at one input 72 of a NAND gate 73. Since the other input 76 of the NAND gate 73 is normally high, the output of the NAND gate 73 is low, and a relay 77 having a coil 78 is de-energized with a contact 80 thereof being normally open.

When the output 61 of the flip-flop 62 goes low, the input 76 of the NAND gate 73 goes low, establishing a high on the output of the NAND gate 73, biasing a transistor 81 into conduction to energize the relay coil 78 closing the relay contact 80 to establish a circuit between the AC source 31 and the television receiver 36 through the power control circuit 33 to turn on the television receiver 36.

The 30 second interval during which the annunciator 38 is activated is considered to be a sufficient warm up time for the television receiver 36.

The converter-tuner 27 is controlled by five binary-coded-decimal (BCD) outputs 86-90 of a storage register 86 through a plurality of AND gates 101-105. A logic low on the output 61 of the flip-flop 62 disables an AND gate 107, the output of which disables the AND gate 101 directly, and disables the AND gates 102-105 through an AND gate 108. The disabled condition of the AND gates 101-105 establishes a signal representative of a predetermined channel, for example, channel 16, at the input of a digital-to-analog converter in the converter-tuner circuit 27 such that the tuner in the converter tuner 27 is tuned to a predetermined channel when the output 61 of the flip-flop 62 goes low. The normal use of the storage register 96 is to store binary data appearing at a plurality of inputs 110-114, which is clocked therein by a clock circuit 116 through an AND gate 117, which is enabled by a signal on an input line 118 controlled by a switch (not shown) in the logic encoder 41 (FIG. 2) as explained in more detail in the aforementioned copending application. The data lines 110-114 and the input line 118 form part of the multi-conductor cable 42 (FIG. 2) along which connects the logic encoder 41 to the digital section 23, along with a pay television input line 119, coupled to one input of NAND gate 121, having its other input connected to one input of the AND gate 101.

Normally, the output of NAND gate 121 is high. The input 119 from the pay television circuit in the logic encoder 41 is normally high and goes low when a pay television program is selected by the viewer to insure a high output from the NAND gate 121 to enable the AND gate 108.

If the input 71 is high, the television receiver 36 is in the "on" condition. A high at the input 71 establishes a low at the input 72 of the NAND gate 73 through an inverter 126. Thus the output of NAND gate 73 is high and the contact 80 of the relay 77 is closed to supply power to the television receiver 36. In this condition of the NAND gate 73, when the output 61 of the flip-flop 62 goes low, it has no effect on the NAND gate 73, since the television receiver 36 is already in the "on" condition i.e., receiving power from the source 31 through the power control circuit 33.

Thus, the modification shown in FIG. 4, together with the introduction of the appropriate function and command codes in the transmission sequence from the master station 11, sounds the annunciator 38, turns on the television receiver 36, and tunes the converter tuner 27 to a predetermined channel by disabling the inputs 86-90 thereto.

After the emergency broadcast has been completed, another transmission sequence is transmitted from the master station 11 to remove the logic high voltage level from the output 47 of the function code register 46 and establish a logic high voltage level on an output 130 thereof, disabling the AND gate 48 and enabling an AND gate 131, changing the state of the output 61 of the flip-flop 62 to return the remote transceiver 12 to the condition in which it was when the emergency alert code was initially transmitted from the central station.

While the invention has been shown and described with reference to a preferred embodiment, other embodiments will be obvious to those having ordinary skill in the art which come within the spirit and scope of the invention as defined in the annexed claims.

What is claimed is:

1. A method of establishing emergency communications between a master station and a remote station in a two-way cable television system, which comprises the steps of:
    activating an annunciator means at the remote station upon application of a first signal;
    connecting power to a television receiver at the remote station upon application of a second signal;
    tuning the remote station to a predetermined channel upon application of a third signal;
    establishing the first, second and third signals in response to a fourth signal;
    conditioning the generation of the fourth signal in response to a coded function signal from the master station; and
    generating the fourth signal in response to a coded command signal from the master station.

2. The method of claim 1 wherein said second signal may be established independently of said fourth signal.

3. An apparatus for establishing emergency communications between a master station and a remote station in a two-way cable television system, which comprises:
    annunciator means at the remote station;
    means for activating said annunciator means upon application of a first signal;
    means for connecting power to a television receiver at the remote station upon application of a second signal;
    means for tuning the remote station to a predetermined channel upon application of a third signal;
    means for establishing said first, second and third signals in response to a fourth signal;
    means for generating said fourth signal;
    means responsive to a coded function signal from the master station for conditioning the fourth signal generating means for operation; and
    means responsive to a coded command signal from the master station for operating the fourth signal generating means.

4. An apparatus according to claim 3 wherein said means for generating said fourth signal comprises:
    a first register means responsive to a coded interrogation signal for identifying the remote station;
    a second register means responsive to said coded function signal for alerting the remote station that a command code will be forthcoming;
    resettable bistable means for generating said fourth signal;
    decoder means coupled to said first and second register means for enabling said bistable means; and
    third register means responsive to a first command signal from said master station for operating said enabled bistable means.

5. An apparatus according to claim 4 wherein said third register means is further responsive to a second command signal for resetting said bistable means to terminate said fourth signal.

6. An apparatus according to claim 5 wherein said means for activating said annunciator means is operative for a predetermined time.

7. An apparatus according to claim 6 wherein said tuning means comprises:
    digital-to-analog converter means responsive to a binary-coded-decimal signal for generating an analog voltage in accordance with said binary-coded-decimal signal;
    means responsive to said analog voltage for selecting a first predetermined channel from a predetermined bandwidth of television signals from said master station and converting it a second predetermined channel; and
    means responsive to said third signal for establishing a predetermined binary-coded-decimal signal input to said digital-to-analog converter means.

8. An apparatus according to claim 7 wherein said power connecting means includes switch means responsive to said second signal.

* * * * *